Jan. 1, 1929.  1,697,776
A. L. McDERMOTT ET AL
CHAIN FOR AUTOMOBILES AND MEANS FOR APPLYING THE SAME
Filed Feb. 15, 1923  2 Sheets-Sheet 1
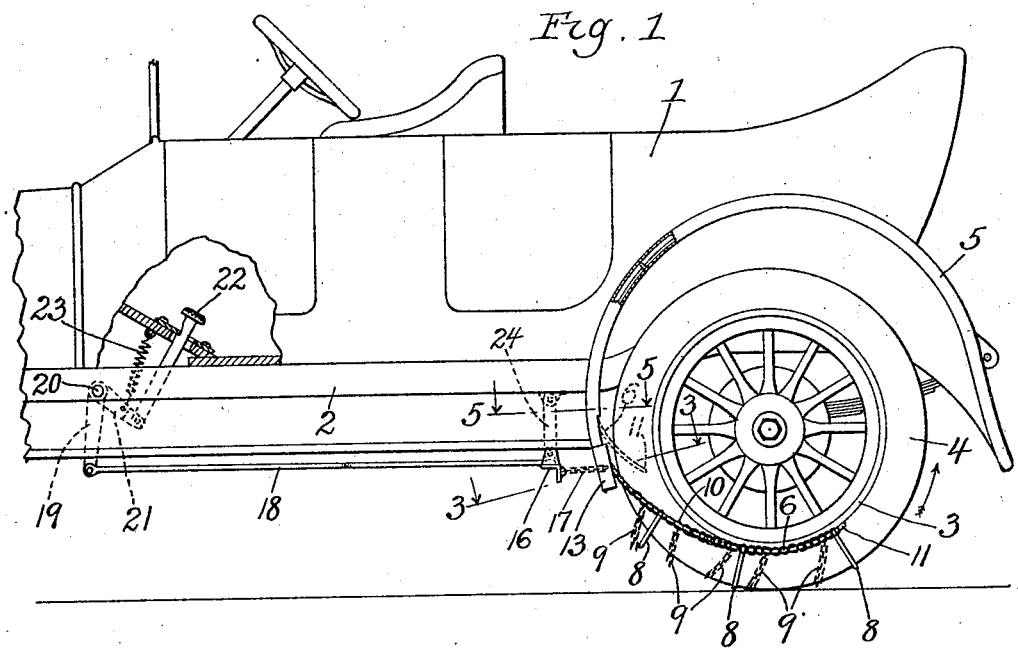
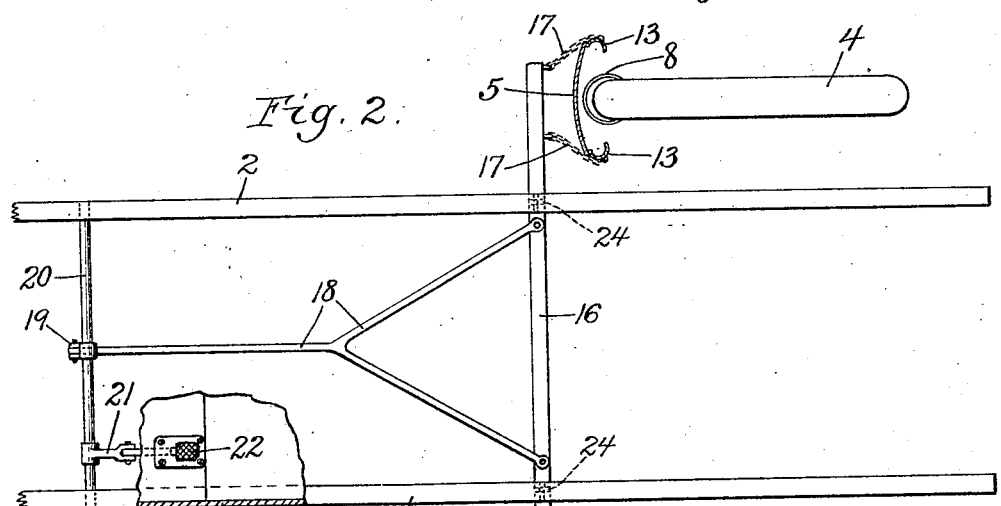
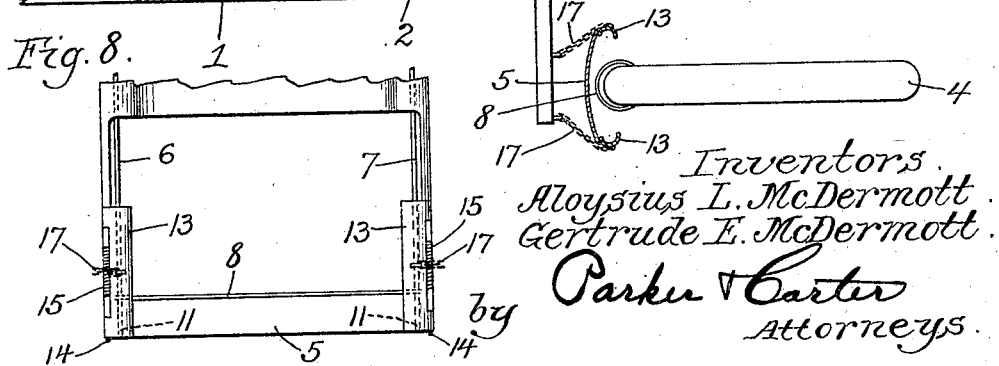
Inventors
Aloysius L. McDermott
Gertrude E. McDermott
by Parker & Carter
Attorneys

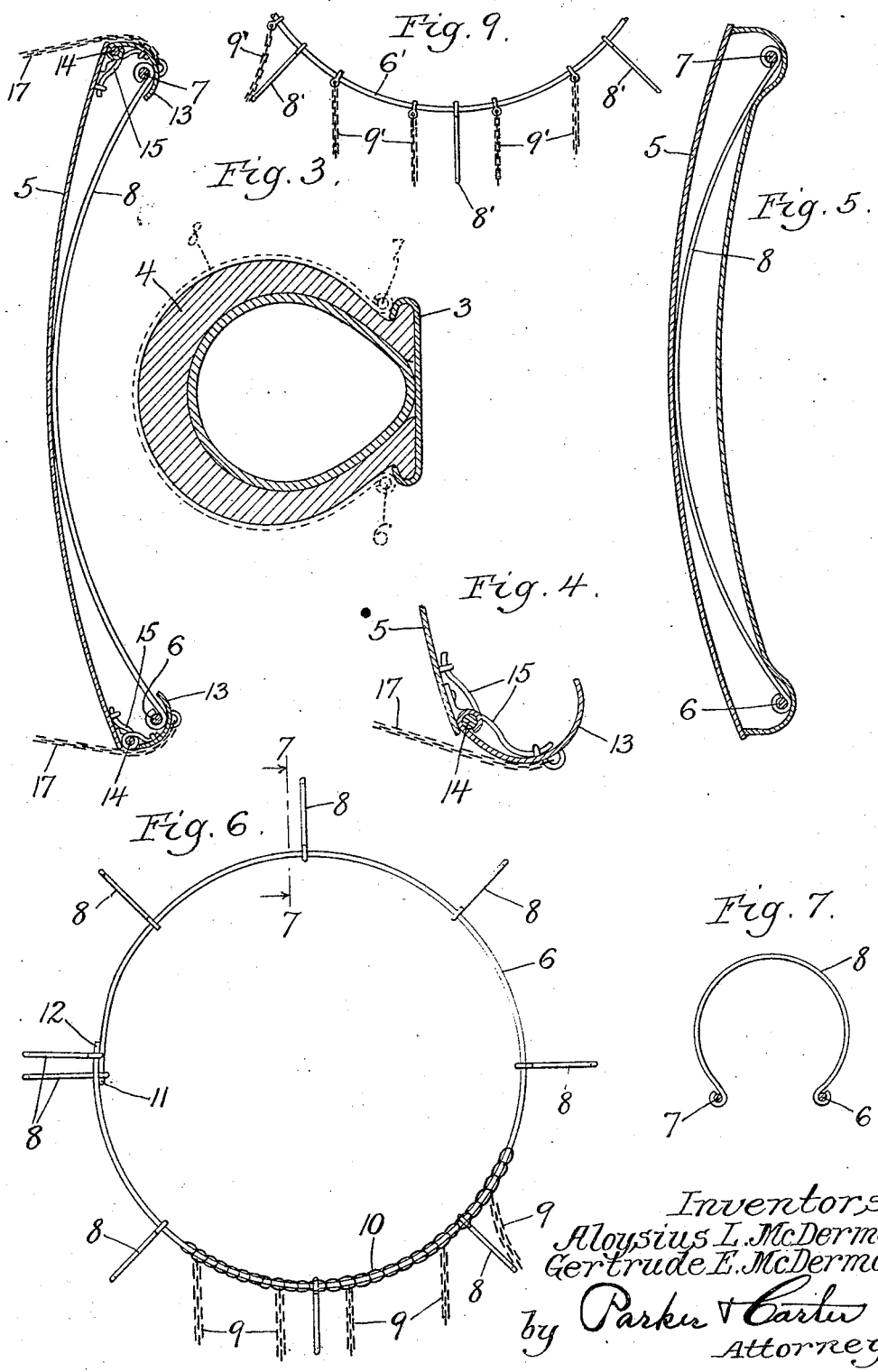

Patented Jan. 1, 1929.

1,697,776

UNITED STATES PATENT OFFICE.

ALOYSIUS L. McDERMOTT AND GERTRUDE E. McDERMOTT, OF MAYWOOD, ILLINOIS.

CHAIN FOR AUTOMOBILES AND MEANS FOR APPLYING THE SAME.

Application filed February 15, 1923. Serial No. 619,289.

Our invention relates to a new and improved chain for automobile wheels and means for applying the same to such wheels and has for its object to provide a new and improved chain of this description and a new and improved means for easily and quickly applying it to the wheel. Chains on automobile wheels are used when the roads are bad and the ordinary chain is difficult to attach to the wheel. In some instances, for example, the automobile runs into a muddy road bed when chains are necessary and it is very difficult and inconvenient to get out in the mud and apply these chains. This invention has among other objects to provide a means for automatically applying the chains to the wheels and without getting out of the automobile. The invention has as a further object to provide a chain which will automatically grip the tire of wheel when applied. The invention has as a further object to provide means for conveniently storing the chains when not in use. The invention has further objects, which are more particularly pointed out in the accompanying description.

Referring now to the drawings:

Fig. 1 is a view in part section showing the rear portion of an automobile as the chain is being applied.

Fig. 2 is a plan view of the chassis, with parts broken away and parts in section.

Fig. 3 is a sectional view on line 3—3 of Fig. 1.

Fig. 4 is an enlarged view of one of the devices for holding and releasing the end of the chain while it is in the storage device.

Fig. 5 is a sectional view taken on line 5—5 of Fig. 1.

Fig. 6 is a side view of one of the chains with a portion of the links removed to illustrate the link supporting device.

Fig. 7 is a sectional view taken on line 7—7 of Fig. 6.

Figure 8 is a view of the end of one of the mud guards.

Figure 9 is a view showing a modified construction of the chain.

Referring now to the drawings, we have shown more or less diagrammatically a representation of the rear end of an automobile having a body 1, a chassis 2, and wheels 3 having the ordinary pneumatic tire 4. The mud guards 5 for the rear wheels are made hollow so as to receive the chains. The chains are made up of the two spring holding pieces 6 and 7 which are connected together at intervals by the spring connecting pieces 8. The pieces 6, 7 and 8 may be made of any suitable material and I have shown them as made of heavy spring wire. The spring connecting pieces 8 tend to press the holding pieces 6 and 7 towards each other. A series of cross chain road engaging members 9 are connected with the holding pieces 6 and 7 so as to extend across the tire when the device is in position. These cross chain pieces may be connected to the holding pieces in any desired manner. If it is desired to use the ordinary chain this may be done and the main or circumferential chain members 10 may be attached to the holding pieces 6 and 7, the cross chain members being attached to these main chain members in the usual way. If it is not desired to use the ordinary chain then the cross chain members 9' as well as the piece 8' may be fastened directly to the holding piece 6' and the similar piece on the other side as illustrated in Fig. 9. The spring holding pieces 6 and 7 are not connected at their ends but such ends 11 and 12 are preferably arranged to overlap when the chains are not being used. When the chains are not being used they are placed in the mud guard 5. To do this the spring holding pieces are separated at their ends 11 and 12 and one end is pushed up into the mud guard and the entire device pushed up therein. When in this position the spring holding pieces 6 and 7 and the spring connecting pieces 8 are partially straightened out as shown in Fig. 5. The inner ends of the mud guard 5 are provided with the movable members 13 which act as holding and releasing members for the chain. These movable members are shown as pivoted at 14 to the body portion of the mud guard and are provided with retracting springs 15 (see Figs. 3 and 4). The inner face of the mud guard is omitted opposite the movable members 13 so that when the chain is released the end will spring out and engage the wheel. The movable members 13 are controlled in any desired manner and we prefer to arrange so that the driver can control them without getting out of the automobile.

One means for this purpose is herein shown. In this construction there is a movable cross bar 16 to which the movable members are connected by flexible connecting devices 17 so that when this bar is moved the movable members will be moved to release the chain. Connected with this bar is a controlling member 18, one end of which is connected to a lever 19 which in turn is connected to the rotating member 20. This rotating member has another lever 21 connected thereto at an angle to the lever 19. Connected with the lever 21 is an actuating piece 22 which is preferably arranged to be actuated by the foot of the driver as clearly shown in Fig. 1. When this actuating piece is pressed the rotating member 20 is rotated, the lower end of the lever 19 moved out and the cross bar 16 moved toward the front of the automobile so as to move the movable pieces 13 and release the chain. We prefer to provide a retracting spring 23 which retracts the parts to their normal position when the actuating piece is released.

When it is desired to apply the chain to the wheel the driver presses the actuating piece 22 and moves the cross bar 16 forward so as to move the movable members 13 outwardly to the position shown for example in Fig. 4, thereby releasing the ends of the spring holding pieces 6 and 7. Since the inner face of the mud guard is removed or open at this point these end pieces when released, being spring members and tending to assume a circular form, spring out automatically and engage the tire of the wheel as shown in dotted lines in Fig. 1, the amount that they spring out depending upon the length of the vertical opening in the mud guard at this point. The rotation of the wheels then carries the chain around until it is completely removed from the mud guard and attached to the wheel. Fig. 1 shows the partial movement of the chain. When the chain is on the wheel the spring holding devices 6 and 7 take the position shown in dotted lines in Fig. 3. It will thus be seen that by means of this invention the chains can be automatically and easily and quickly applied to the wheels of the automobile and without the necessity of the driver getting out of the machine and this can be done at any time and at any place.

When it is desired to remove the chains it is only necessary to spring apart the spring holding pieces 6 and 7 and remove the chains. The ends of the spring holding pieces are then pushed up into the mud guard and the entire chain pushed up therein as before described. The wheels may be used to help in this process if desired. In such case the ends of the spring holding pieces are pushed up into the mud guards and then the automobile is backed slowly so as to push the device up into the guards. In order to not interfere with the appearance of the automobiles we have used the mud guards as the chain containers as these mud guards are curved around the wheel and may be easily constructed for this purpose. It is of course evident that a special chain container may be used if desired. The chains may of course be used without the automatic attachment feature if desired in which event they will be placed in position by spreading out the spring holding pieces 6 and 7 and moving them into position and rotating the wheel.

We claim:

1. The combination with an automobile wheel chain of spring holding pieces to which the cross chain members are connected having their ends disconnected and adapted to extend circumferentially around the wheel, spring connecting pieces connecting them together, a hollow chain container bent around the upper portion of the wheel and into which the spring holding pieces and associated parts are normally contained, means for releasing the ends of the spring holding pieces so as to leave them free to spring out and engage the wheel, the rotation of the wheel withdrawing the entire device from the container and applying it to the wheel.

2. Means for applying an automobile chain to the wheel comprising spring holding pieces to which the cross chain members are attached, a hollow container above the wheel into which said spring holding pieces are received, means for releasing the ends of the spring holding pieces to leave them free to fly out and engage the wheel, the rotation of the wheel withdrawing the spring holding pieces and associated parts from the container and applying them to the wheel.

3. Means for applying an automobile chain to the wheel comprising spring holding pieces adapted to extend circumferentially around the wheel and to which the chain cross members are connected, a container in proximity to the wheel in which said spring holding pieces are contained, movable holding and releasing members connected with said chain container and normally engaging the ends of the spring holding pieces, a controlling mechanism controlled from a distant point for moving said movable members to release the ends of the spring holding pieces so that they are free to spring out and engage the wheel, the rotation of the wheel withdrawing said holding pieces and associated parts from the container and applying them to the wheel.

4. A chain for automobiles comprising two separated holding pieces normally extending circumferentially around the wheel and having their ends disconnected, spring connecting pieces connecting said spring holding pieces at intervals and cross chain members extending across between the spring holding pieces so as to engage the road when the wheel is rotated.

5. Means for automatically applying an automobile chain to the wheel comprising spring holding pieces, cross chain members attached thereto, means for supporting said spring holding pieces, when not in use, in proximity to the wheel and partially surrounding the same, the spring holding pieces having their ends disconnected, means for releasing the ends of said spring holding pieces so that they can move to engage the wheel, the rotation of the wheel applying the spring holding pieces and associated parts to the wheel.

Signed at Chicago, county of Cook and State of Illinois, this 1st day of February, 1923.

ALOYSIUS L. McDERMOTT.
GERTRUDE E. McDERMOTT.